United States Patent [19]

Noguchi

[11] Patent Number: 5,216,650

[45] Date of Patent: Jun. 1, 1993

[54] TRACK JUMPING CONTROL APPARATUS

[75] Inventor: Yoshihiro Noguchi, Kawasaki, Japan

[73] Assignee: Matsushita Graphic Communication Systems, Inc., Tokyo, Japan

[21] Appl. No.: 718,675

[22] Filed: Jun. 21, 1991

[30] Foreign Application Priority Data

Jun. 26, 1990 [JP] Japan ................................ 2-167715

[51] Int. Cl.$^5$ ................................................ G11B 7/00
[52] U.S. Cl. ................................ 369/44.28; 369/50; 369/54; 369/32
[58] Field of Search ................. 369/32, 44.27, 44.28, 369/44.29, 48, 44.11, 44.26, 44.34, 44.35, 58, 50, 54; 360/72.2, 78.14

[56] References Cited

U.S. PATENT DOCUMENTS 4,561,026 12/1985 Abe0 et al. .......................... 369/48
4,819,219 4/1989 Nagano ................................ 369/32
4,955,010 9/1990 Nabeshima et al. ............. 369/44.11

Primary Examiner—Aristotelis Psitos
Assistant Examiner—Nabil Hindi
Attorney, Agent, or Firm—Lowe, Price, LeBlanc & Becker

[57] ABSTRACT

Clock pulses are generated at a frequency having a fixed relation with a rotation of an information recording disk formed with a track. The clock pulses are counted. A first kick pulse is generated when the counting of the clock pulses starts. A tracking error signal is generated. A detection is made as to whether the tracking error signal crosses a zero level after the first kick pulse is generated. A brake pulse is generated when the tracking error signal crosses the zero level. A second kick pulse is generated when a number of the counted clock pulses reaches a predetermined number.

4 Claims, 7 Drawing Sheets

TRACK JUMPING CONTROL APPARATUS

BACKGROUND OF THE INVENTION

This invention relates to a track jumping control apparatus for a disk drive system such as an optical disk drive system.

In optical disk drive systems, when the reproduction of information from an optical disk is required, an information reading laser light beam emitted from an optical pickup is moved so as to meet a track line part on which the information is recorded. This movement of the laser light beam is generally performed by a 2-stage drive mechanism including a coarse-motion motor and a fine-motion actuator. The coarse-motion motor executes a coarse seeking process. The fine-motion actuator executes a fine seeking process. During the coarse seeking process, a carriage including the optical pickup is moved to a target position by the coarse-motion motor. When the optical pickup moves to a position near a target track line part as a result of the coarse seeking process, the fine seeking process is started. During the fine seeking process, the laser light beam is repeatedly subjected to a step-jumping motion which corresponds to a radial displacement from a track line part to a neighboring track line part. Each step-jumping motion is realized by feeding a pair of a positive pulse current (a kick pulse current) and a negative pulse current (a brake pulse current) to the fine-motion actuator.

As will be explained later, a prior art apparatus for such track jumping control has some problem.

SUMMARY OF THE INVENTION

It is an object of this invention to provide an improved track jumping control apparatus.

A first aspect of this invention provides a track jumping control apparatus for use with an information recording disk and an information reading device, the disk having a track, the reading device having an actuator responsive to a kick pulse and a brake pulse, the apparatus comprising means for generating clock pulses at a frequency having a fixed relation with a rotation of the disk;

means for counting the clock pulses; means for generating a first kick pulse when the counting means starts to count the clock pulses; means for generating a tracking error signal; means for detecting that the tracking error signal crosses a zero level after the first kick pulse is generated; means for generating a brake pulse when the detecting means detects that the tracking error signal crosses the zero level; and means for generating a second kick pulse when a number of the clock pulses counted by the counting means reaches a predetermined number.

A second aspect of the invention provides a track jumping control apparatus for use with an information recording disk and an information reading device, the disk having a track, and the reading device having an actuator responsive to a kick pulse and a brake pulse, the apparatus comprising means for generating clock pulses in response to a rotation of the disk; means for generating a first kick pulse; counting means for starting to count the clock pulses when the first kick pulse is generated; means for ending the first kick pulse when a number of the clock pulses counted by the counting means reaches a first predetermined number; means for generating a tracking error signal; means for detecting that the tracking error signal crosses a zero level; means for, during a period after the first kick pulse is ended, generating a brake pulse when the detecting means detects that the tracking error signal crosses the zero level; means for ending the brake pulse when a number of the clock pulses counted by the counting means reaches a second predetermined number greater than the first predetermined number; and means for generating a second kick pulse when a number of the clock pulses counted by the counting means reaches a third predetermined number greater than the second predetermined number.

A third aspect of this invention provides a track jumping control apparatus for use with an information recording disk and an information reading device, the disk having a spiral track, the reading device having an actuator for driving a scanning light to jump between neighboring line parts of the track in response to a drive pulse, the apparatus comprising means for generating clock pulses in response to a rotation of the disk; means for feeding a first drive pulse to the actuator; counting means for starting to count the clock pulses when the first drive pulse is fed to actuator; and means for feeding a second drive pulse to the actuator when a number of the clock pulses counted by the counting means reaches a predetermined number.

A fourth aspect of this invention provides a track jumping control apparatus for use with an information recording disk and an information reading device, the disk having a spiral track, and the reading device having an actuator for driving a scanning light to jump between neighboring line parts of the track in response to a pair of sequentially arranged kick pulse and brake pulse, the apparatus comprising means for generating a predetermined number of pairs of sequentially arranged kick pulse and brake pulse; means for sensing a rotation of the disk; and means for correcting the predetermined number of the pairs in accordance with the sensed rotation of the disk.

DESCRIPTION OF THE PRIOR ART

Figure 1:
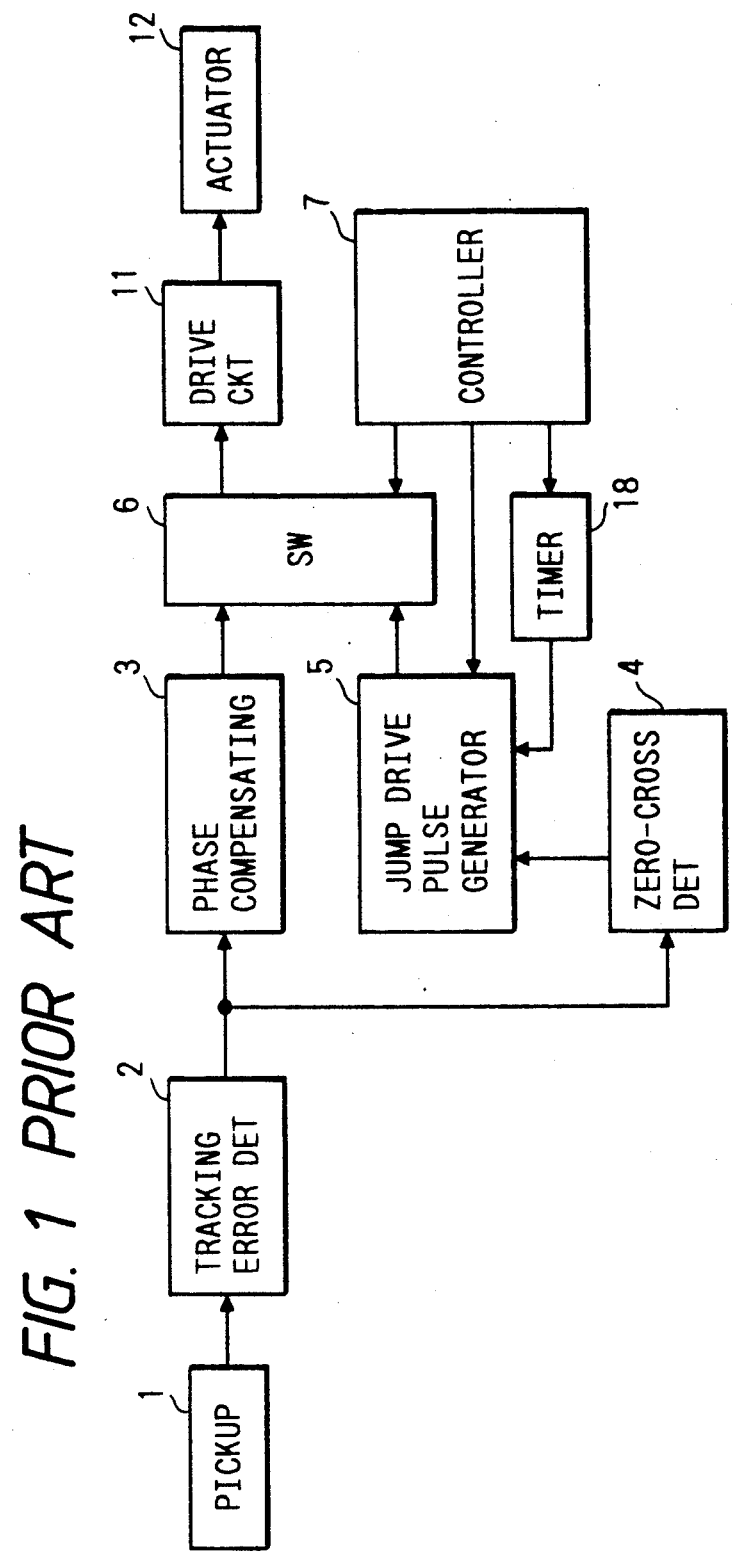
FIG. 1 is a block diagram of a prior art track jumping control apparatus.

With reference to FIG. 1, a prior art track jumping control apparatus includes a controller 7. When the controller 7 outputs a track jumping instruction to a jumping drive pulse generator 5, the device 5 outputs a kick pulse. The kick pulse outputted from the jumping drive pulse generator 5 passes through a switch 6, being inputted into a drive circuit 11. The drive circuit 11 drives a tracking actuator (a fine-motion actuator) 12 in response to the kick pulse, so that the tracking actuator 12 jumps an information reading laser light beam over one track line part on an optical disk and specifically moves the laser light beam from a track line part to a neighboring track line part.

In the prior art tracking jumping control apparatus of FIG. 1, an optical pickup 1 monitors the above-mentioned track jumping motion, and outputs an RF signal in response to the track jumping motion. A tracking error detector 2 converts the RF signal into a tracking error signal TE. A zero-cross detector 4 senses that the tracking error signal TE crosses a zero point. The zero-cross detector 4 outputs a zero-cross signal representing that the tracking error signal TE crosses the zero point. The jumping drive pulse generator 5 outputs a brake pulse in response to the zero-cross signal fed from the zero-cross detector 4. The brake pulse outputted from the jumping drive pulse generator 5 passes through the switch 6, being inputted into the drive circuit 11. The drive circuit 11 brakes the tracking actuator 12 in response to the brake pulse.

When the brake pulse ends, a timer 18 is triggered. At a moment which follows the moment of the triggering of the timer 18 by a preset time, the timer 18 outputs a timer signal to the jumping drive pulse generator 5. The jumping drive pulse generator 5 outputs a next kick pulse in response to the timer signal, so that the tracking actuator 12 is driven to jump the laser light beam between neighboring track line parts on the optical disk. Such drive of the tracking actuator 12 is periodically reiterated by the operation of the timer 18. Specifically, the period of the occurrence of kick pulses is determined by the preset time of the timer 18.

The prior art track jumping control apparatus has the following problem. Since the period of the occurrence of kick pulses is determined by the preset time of the timer 18, the laser light beam tends to jump over track line parts independently of the rotation of the optical disk. Accordingly, under conditions where the laser light beam is required to jump a large number of track line parts, the track jumping control tends to be inaccurate. In addition, the accuracy of the track jumping control is sensitive to the accuracy of the timer 18.

DESCRIPTION OF THE FIRST PREFERRED EMBODIMENT

Figure 2:
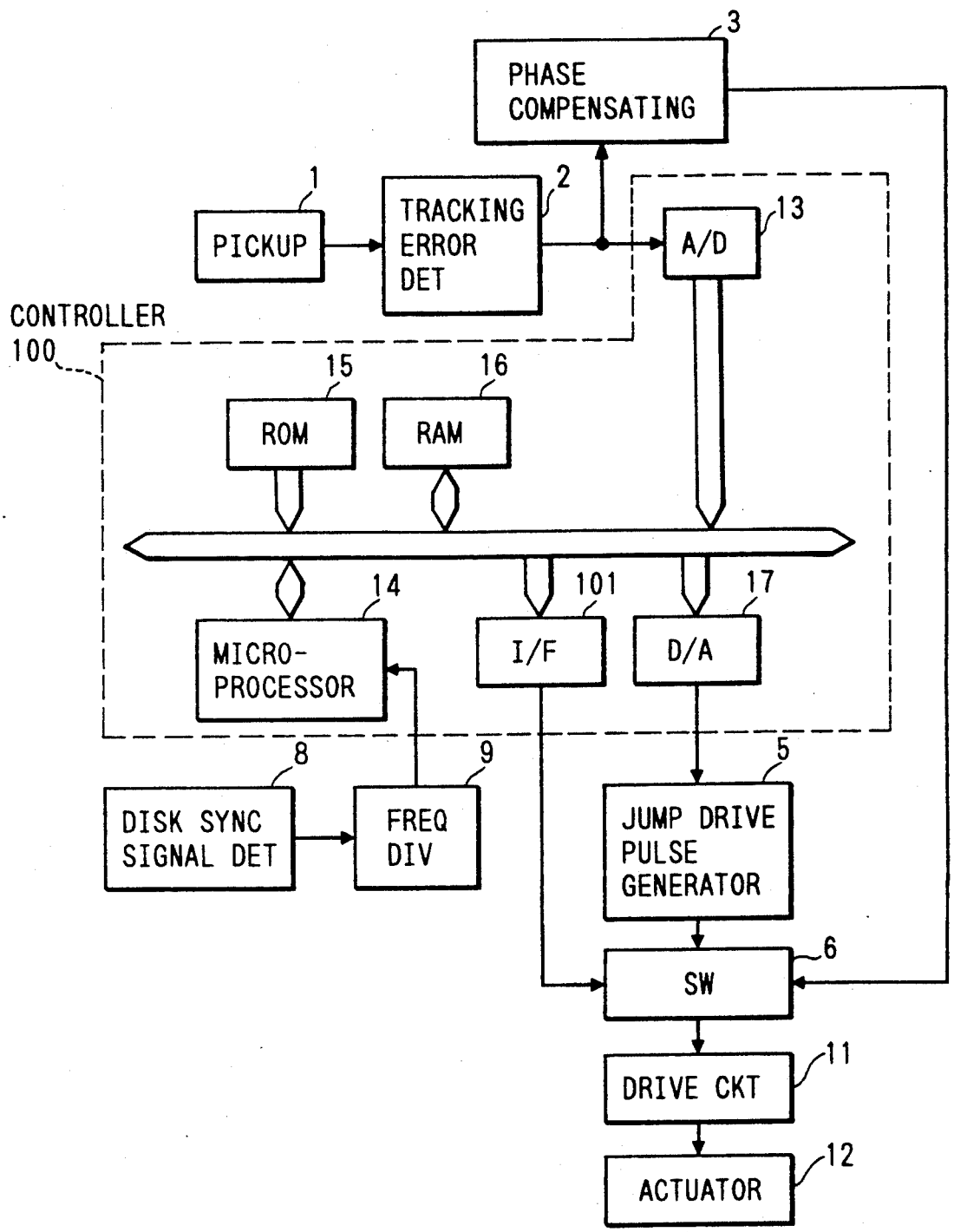
FIG. 2 is a block diagram of a track jumping control apparatus according to a first embodiment of this invention.

With reference to FIG. 2, a track jumping control apparatus of a first embodiment of this invention includes an optical pickup 1 which applies a laser light spot to an optical disk (not shown). The light spot is reflected by the optical disk, returning to the optical pickup 1. The optical pickup 1 outputs an RF signal in response to the returned light. A tracking error detector 2 outputs a tracking error signal TE in response to the RF signal. The tracking error signal TE is fed to a phase compensating circuit 3. The tracking error signal TE is also fed to an analog-to-digital (A/D) converter 13 within a controller 100. The tracking error signal TE is converted by the A/D converter 13 into a corresponding digital signal, which is processed within the controller 100.

A switch 6 connected between the phase compensating circuit 3 and a drive circuit 11 is controlled by the controller 100. Specifically, the switch 6 is controlled by the output signal from an interface 101 within the controller 100. The drive circuit 11 is connected to a tracking actuator 12. During a normal information reproducing process, the controller 100 controls the switch 6 so that the phase compensating circuit 3 will be coupled to the drive circuit 11. During the normal information reproducing process, the phase compensating circuit 3 and the drive circuit 11 cooperate to execute tracking servo control by driving the tracking actuator 12.

A jumping drive pulse generator 5 is connected to the switch 6. During a seeking process, the controller 100 controls the switch 6 so that the jumping drive pulse generator 5 will be coupled to the drive circuit 11. A disk sync signal detector 8 including a phase-locked loop circuit detects a sync signal representative of rotation of the optical disk. A frequency divider 9 divides the frequency of the output signal from the disk sync signal detector 8, and outputs clock pulses which have a predetermined regular relation with the rotation of the optical disk. The clock pulses are fed to a microprocessor 14 within the controller 100.

The jumping drive pulse generator 5 is controlled by the output signal from a digital-to-analog (D/A) converter 17 within the controller 100. When the controller 100 outputs seeking instructions to the jumping drive pulse generator 5 and the switch 6, the jumping drive pulse generator 5 outputs a kick pulse and simultaneously the switch 6 couples the jump drive pulse generator 5 to the drive circuit 11. Thus, the kick pulse is transmitted from the jumping drive pulse generator 5 to the drive circuit 11 via the switch 6. The drive circuit 11 drives the tracking actuator 12 in response to the kick pulse, so that the tracking actuator 12 jumps an information reading laser light beam over one track line part on the optical disk and specifically moves the laser light beam from a track line part to a neighboring track line part.

The optical pickup 1 monitors the above-mentioned track jumping motion, and outputs the RF signal in response to the track jumping motion. The tracking error detector 2 converts the RF signal into the tracking error signal TE. The controller 100 functions to detect whether or not the tracking error signal TE crosses a zero point. When the controller 100 detects that the tracking error signal TE crosses the zero point, the controller 100 outputs a zero-cross signal to the jumping drive pulse generator 5. The jumping drive pulse generator 5 outputs a brake pulse in response to the zero-cross signal. The brake pulse outputted from the jumping drive pulse generator 5 passes through the switch 6, being inputted into the drive circuit 11. The drive circuit 11 brakes the tracking actuator 12 in response to the brake pulse.

When the controller 100 controls the jumping drive pulse generator 5 so that the jumping drive pulse generator 5 will output the kick pulse, the controller 100 simultaneously executes a process of counting the clock pulses fed from the frequency divider 9. When the number of the counted clock pulses reaches a predetermined number, the controller 100 controls the jumping drive pulse generator 5 so that the jumping drive pulse generator 5 will output a next kick pulse. Outputting a kick pulse is reiterated until the jump over a designated number of track line parts is completed.

In general, a track extends spirally on the optical disk. Accordingly, under conditions where a jump over track line parts is required to be done within a period comparable to or longer than the period of one revolution of the optical disk, it is preferable to correct the estimated number of the track line parts. A description will be given of an exemplary case where a jump over 40 track line parts is required to be done during the period of one revolution of the optical disk. In this case, since the optical disk rotates through 360 degrees, a jump over 39 or 41 track line parts is actually executed instead of the jump over 40 track line parts if the number of the track line parts is not corrected. Accordingly, in order to realize the jump over 40 track line parts, it is preferable to execute control intended for a jump over 39 or 41 track line parts. In summary, it is preferable to compensate for an adverse factor which might result from the spiral design of the track on the optical disk.

Figure 3:
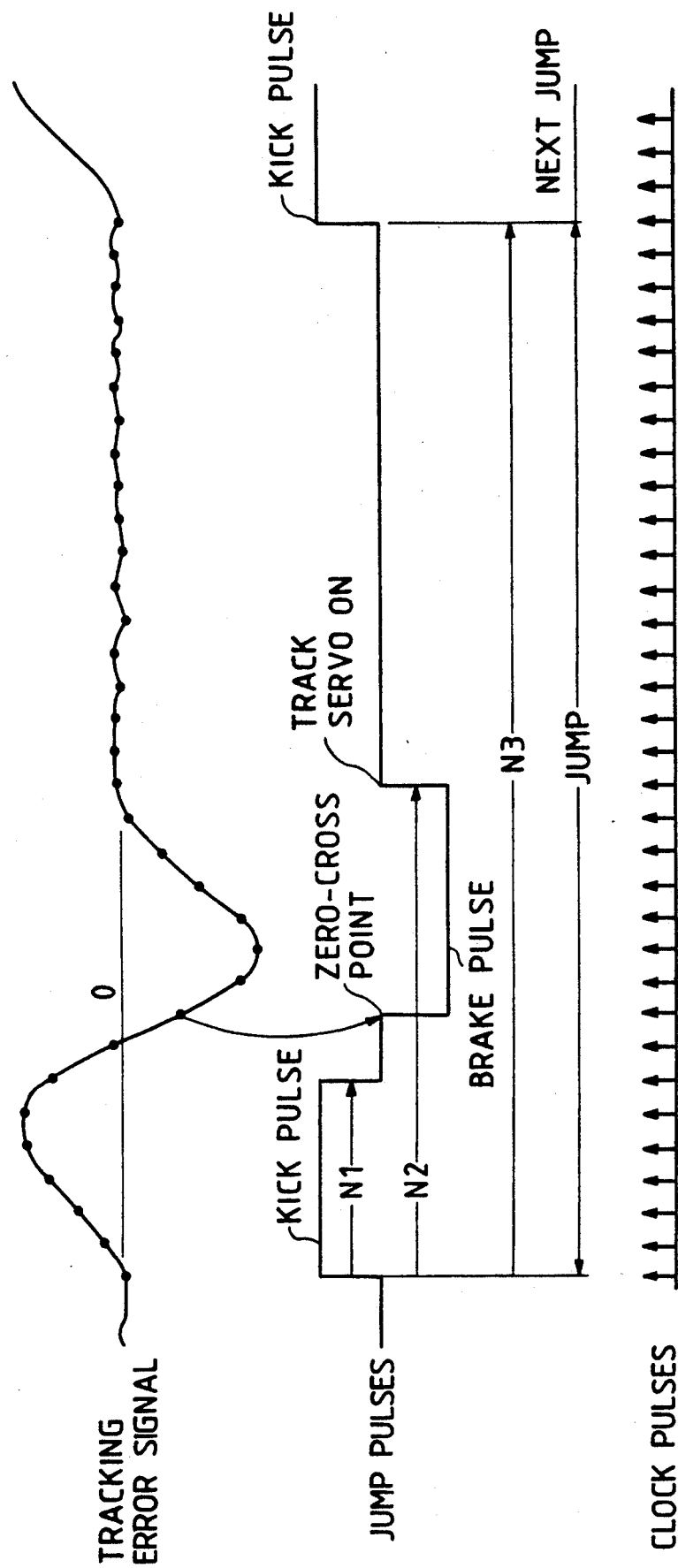
FIG. 3 is a time domain diagram showing the waveforms of various signals in the apparatus of FIG. 2.

FIG. 3 shows the relation among the clock pulses, the kick pulse, the brake pulse, and the tracking error signal TE. As described previously, the clock pulses have the predetermined regular relation with the rotation of the optical disk. While the optical disk rotates at a constant speed, the clock pulses occur at a constant period. At the start of each kick pulse, the controller 100 starts to count the clock pulses. As shown in FIG. 3, at the start of the kick pulse, the level of the tracking error signal TE rises from a zero level. Then, the level of the tracking error signal TE increases and decreases along a sinusoidal curve, and crosses the zero level. This change in the level of the tracking error signal TE means that the laser light beam moves from a track line part to a neighboring track line part. The controller 100 controls the jumping drive pulse generator 5 so that the kick pulse will be ended when the number of the counted clock pulses reaches a predetermined number N1 as shown in FIG. 3. When the controller 100 detects that the level of the tracking error signal TE crosses the zero level, the controller 100 controls the jumping drive pulse generator 5 so that the jumping drive pulse generator 5 will output a brake pulse. As shown in FIG. 3, during the presence of the brake pulse, the level of the tracking error signal TE drops and then returns to the zero level. The controller 100 controls the jumping drive pulse generator 5 so that the brake pulse will be ended when the number of the counted clock pulses reaches a predetermined number N2 as shown in FIG. 3. At the end of the brake pulse, the controller 100 controls the switch 6 so that the tracking servo control will be commenced and the laser light beam can be started to follow the track. When the number of the counted clock pulses reaches a predetermined number N3, the controller 100 controls the jumping drive pulse generator 5 and the switch 6 so that a next kick pulse will be generated and transmitted to execute a subsequent jump from the track line part to a neighboring track line part.

Outputting a pair of a kick pulse and a brake pulse is reiterated until the jump over a designated number of track line parts is completed. The designated number of the track line parts is corrected in response to conditions of rotation of the optical disk in order to compensate for the previously-mentioned adverse factor which might result from the spiral design of the track on the optical disk.

Figure 4:
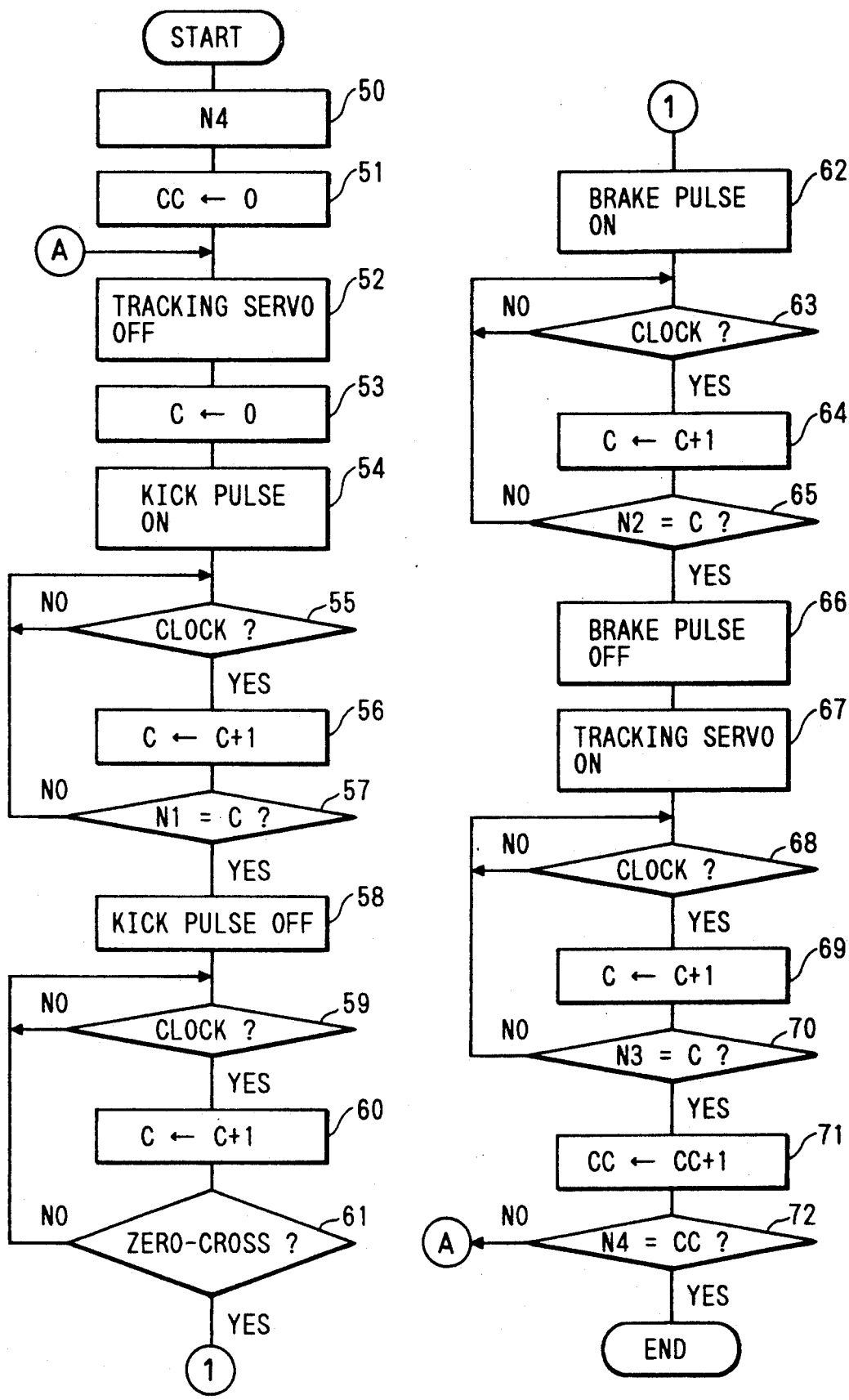
FIG. 4 is a flowchart of a program operating the controller of FIG. 2.

As shown in FIG. 2, the controller 100 includes a combination of the microprocessor 14, a ROM 15, a RAM 16, a A/D converter 13, the D/A converter 17, and the interface 101. The microprocessor 14 operates in accordance with a program stored in the ROM 15. FIG. 4 is a flowchart of the program.

As shown in FIG. 4, a first step 50 of the program calculates a number N4 for determining the total number of track line parts jumped by the laser light beam. Specifically, the number N4 is calculated by adding a primary designated number N0 and a corrective number N5. The primary designated number N0 is equal to an originally estimated total number of track line parts jumped by the laser light beam. The corrective number N5 is determined on the basis of rotation of the optical disk. The corrective number N5 is calculated as follows. When the required jump extends in a radially outward direction of the optical disk, the value Un is calculated by referring to the equation "$U_n = -N_0/(T_n - 1)$" where Tn denotes the number of track line parts jumped by the laser light beam during one revolution of the optical disk. The number Tn is determined in consideration of the rotational speed of the optical disk which is derived from the clock pulses. When the required jump extends in a radially inward direction of the optical disk, the value Dn is calculated by referring to the equation "$D_n = N_0/(T_n + 1)$". The corrective number N5 is set equal to a result of rounding the value Un or Dn.

A step 51 following the step 50 clears a variable CC, representing the number of counted track line parts, to 0. After the step 51, the program advances to a step 52. The step 52 suspends the tracking servo control. Specifically, the step 52 controls the switch 6 so that the drive circuit 11 will be disconnected from the phase compensating circuit 3 and be connected to the jumping drive pulse generator 5. A step 53 following the step 52 clears a variable C, representing the number of counted clock pulses, to 0. A step 54 following the step 53 controls the jumping drive pulse generator 5 so that the jumping drive pulse generator 5 will output a kick pulse. After the step 54, the program advances to a step 55.

The step 55 decides whether or not an interruption process responsive to a clock pulse should be executed. When the step 55 decides that the interruption process responsive to the clock pulse should be executed, the program advances to a step 56. Otherwise, the step 55 is executed again. The step 56 increments the counted clock pulse number C by 1. As a result of the operation of the steps 55 and 56, the counted clock pulse number C is incremented by 1 each time a clock pulse occurs. A step 57 following the step 56 compares the counted clock pulse number C with the predetermined number N1. When the counted clock pulse number C is equal to the predetermined number N1, the program advances to a step 58. Otherwise, the program returns to the step 55. The step 58 controls the jumping drive pulse generator 5 so that the kick pulse will be ended. After the step 58, the program advances to a step 59.

The step 59 decides whether or not an interruption process responsive to a clock pulse should be executed. When the step 59 decides that the interruption process responsive to the clock pulse should be executed, the program advances to a step 60. Otherwise, the step 59 is executed again. The step 60 increments the counted clock pulse number C by 1. As a result of the operation of the steps 59 and 60, the counted clock pulse number C is incremented by 1 each time a clock pulse occurs. A step 61 following the step 60 detects whether or not the level of the tracking error signal TE crosses the zero level. When the step 61 detects that the level of the tracking error signal TE crosses the zero level, the program advances to a step 62. Otherwise, the program returns to the step 59. The step 62 controls the jumping drive pulse generator 5 so that the jumping drive pulse generator 5 will output a brake pulse. After the step 62, the program advances to a step 63.

The step 63 decides whether or not an interruption process responsive to a clock pulse should be executed.

When the step 63 decides that the interruption process responsive to the clock pulse should be executed, the program advances to a step 64. Otherwise, the step 63 is executed again. The step 64 increments the counted clock pulse number C by 1. As a result of the operation of the steps 63 and 64, the counted clock pulse number C is incremented by 1 each time a clock pulse occurs. A step 65 following the step 64 compares the counted clock pulse number C with the predetermined number N2. When the counted clock pulse number C is equal to the predetermined number N2, the program advances to a step 66. Otherwise, the program returns to the step 63. The step 66 controls the jumping drive pulse generator 5 so that the brake pulse will be ended. A step 67 following the step 66 starts the tracking servo control. Specifically, the step 67 controls the switch 6 so that the drive circuit 11 will be connected from the phase compensating circuit 3 and be disconnected from the jumping drive pulse generator 5. After the step 67, the program advances to a step 68.

The step 68 decides whether or not an interruption process responsive to a clock pulse should be executed. When the step 68 decides that the interruption process responsive to the clock pulse should be executed, the program advances to a step 69. Otherwise, the step 68 is executed again. The step 69 increments the counted clock pulse number C by 1. As a result of the operation of the steps 68 and 69, the counted clock pulse number C is incremented by 1 each time a clock pulse occurs. A step 70 following the step 69 compares the counted clock pulse number C with the predetermined number N3. When the counted clock pulse number C is equal to the predetermined number N3, the program advances to a step 71. Otherwise, the program returns to the step 68.

The step 71 increments the counted track groove number CC by 1. A step 72 following the step 71 compares the counted track groove number CC with the designated number N4. When the counted track groove number CC is equal to the designated number N4, the current execution cycle of the program is ended. Otherwise, the program returns to the step 52. It should be noted that the designated number N4 is varied in response to conditions of rotation of the optical disk in order to compensate for the previously-mentioned adverse factor which might result from the spiral design of the track on the optical disk.

DESCRIPTION OF THE SECOND PREFERRED EMBODIMENT

Figure 5:
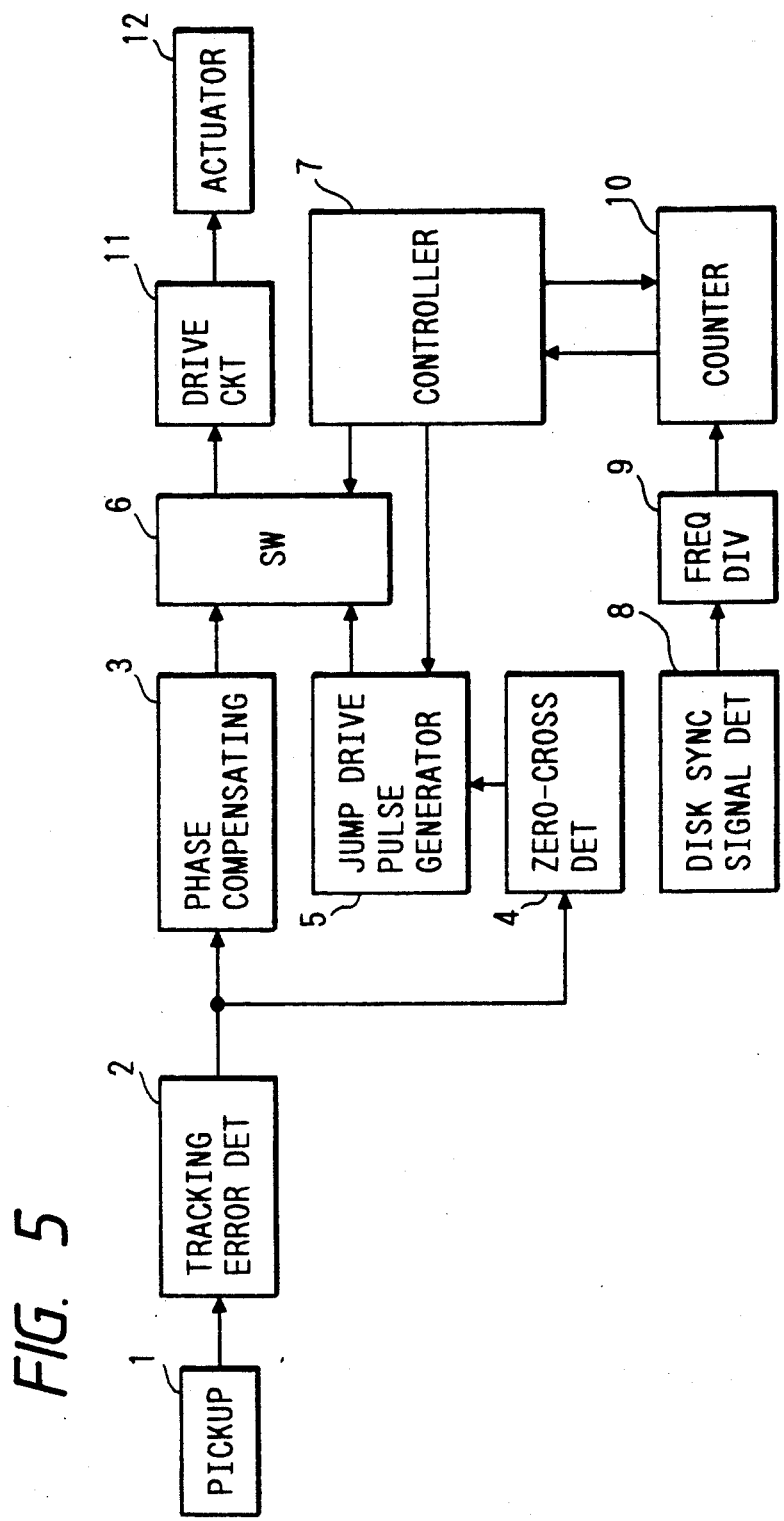
FIG. 5 is a block diagram of a track jumping control apparatus according to a second embodiment of this invention.

With reference to FIG. 5, a track jumping control apparatus of a second embodiment of this invention includes an optical pickup 1 which applies a laser light spot to an optical disk (not shown). The light spot is reflected by the optical disk, returning to the optical pickup 1. The optical pickup 1 outputs an RF signal in response to the returned light. A tracking error detector 2 outputs a tracking error signal TE in response to the RF signal. The tracking error signal TE is fed to a phase compensating circuit 3 and a zero-cross detector 4.

A switch 6 connected between the phase compensating circuit 3 and a drive circuit 11 is controlled by a controller 7. The drive circuit 11 is connected to a tracking actuator 12. During a normal information reproducing process, the controller 7 controls the switch 6 so that the phase compensating circuit 3 will be coupled to the drive circuit 11. During the normal information reproducing process, the phase compensating circuit 3 and the drive circuit 11 cooperate to execute tracking servo control by driving the tracking actuator 12.

A jumping drive pulse generator 5 is connected to the switch 6. During a seeking process, the controller 7 controls the switch 6 so that the jumping drive pulse generator 5 will be coupled to the drive circuit 11. A disk sync signal detector 8 including a phase-locked loop circuit detects a sync signal representative of rotation of the optical disk. A frequency divider 9 divides the frequency of the output signal from the disk sync signal detector 8, and outputs clock pulses which have a predetermined regular relation with the rotation of the optical disk. A counter 10 counts the output clock pulses from the frequency divider 9. The counter 10 is connected to the controller 7. At the start of a kick pulse, the controller 7 resets the counter 10. By referring to the output signal from the counter 10, the controller 7 determines a timing for ending the kick pulse, a time for ending a brake pulse, and a timing for starting a next kick pulse. Specifically, when the counted clock pulse number represented by the output signal from the counter 10 reaches a predetermined number N1 (see FIG. 3), the controller 7 operates to end the kick pulse. When the counted clock pulse number reaches a predetermined number N2 (see FIG. 3), the controller 7 operates to end the brake pulse. When the counted clock pulse number reaches a predetermined number N3 (see FIG. 3), the controller 7 operates to start a next kick pulse.

When the controller 7 outputs seeking instructions to the jumping drive pulse generator 5 and the switch 6, the jumping drive pulse generator 5 outputs a kick pulse and simultaneously the switch 6 couples the jump drive pulse generator 5 to the drive circuit 11. Thus, the kick pulse is transmitted from the jumping drive pulse generator 5 to the drive circuit 11 via the switch 6. The drive circuit 11 drives the tracking actuator 12 in response to the kick pulse, so that the tracking actuator 12 jumps an information reading laser light beam over one track line part on the optical disk and specifically moves the laser light beam from a track line part to a neighboring track line part.

The optical pickup 1 monitors the above-mentioned track jumping motion, and outputs the RF signal in response to the track jumping motion. The tracking error detector 2 converts the RF signal into the tracking error signal TE. The zero-cross detector 4 senses that the tracking error signal TE crosses a zero point. The zero-cross detector 4 outputs a zero-cross signal representing that the tracking error signal TE crosses the zero point. The zero-cross signal is fed to the jumping drive pulse generator 5. The jumping drive pulse generator 5 outputs a brake pulse in response to the zero-cross signal. The brake pulse outputted from the jumping drive pulse generator 5 passes through the switch 6, being inputted into the drive circuit 11. The drive circuit 11 brakes the tracking actuator 12 in response to the brake pulse.

When the controller 7 controls the jumping drive pulse generator 5 so that the jumping drive pulse generator 5 will output the kick pulse, the controller 7 simultaneously controls the counter 10 so that the counter 10 will start to count the clock pulses. When the number of the clock pulses counted by the counter 10 reaches the predetermined number N3, the controller 7 controls the jumping drive pulse generator 5 so that the jumping drive pulse generator 5 will output a next kick pulse.

Outputting a pair of a kick pulse and a brake pulse is reiterated until the jump over a designated number of track line parts is completed.

The counter 10 includes an additional section designed to count track line parts over which the laser light beam jumps. The controller 7 uses the number of the counted track line parts in the decision as to whether or not the jump over the designated number of the track line parts is completed.

The controller 7 is composed of a microcomputer or a microprocessor having a combination of a CPU, a ROM, a RAM, and an I/O port. The controller 7 executes the previously-mentioned processes in accordance with a program stored in the ROM.

DESCRIPTION OF THE THIRD PREFERRED EMBODIMENT

Figure 6:
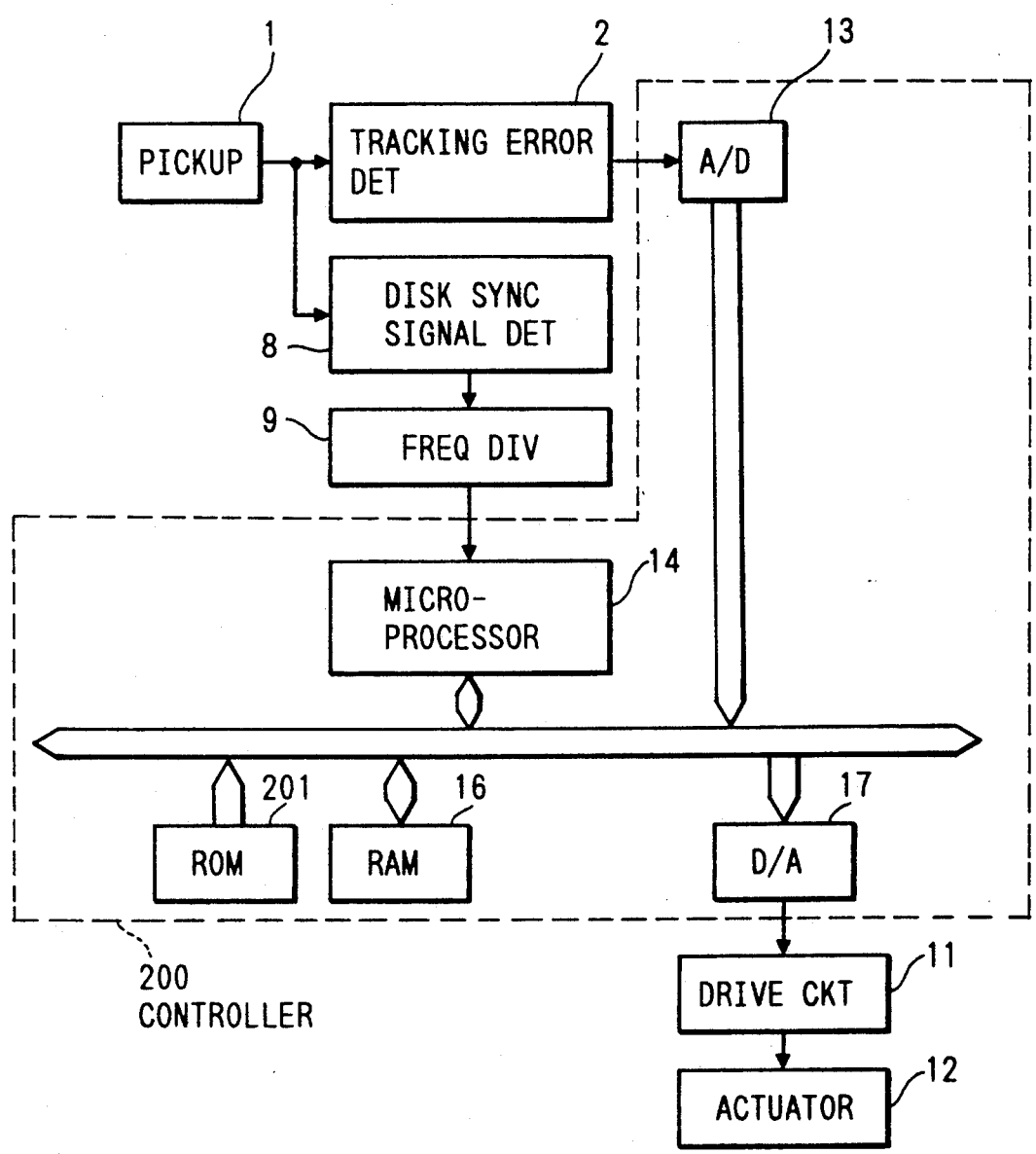
FIG. 6 is a block diagram of a track jumping control apparatus according to a third embodiment of this invention.

With reference to FIG. 6, a track jumping control apparatus of a third embodiment of this invention includes an optical pickup 1 which applies a laser light spot to an optical disk (not shown). The light spot is reflected by the optical disk, returning to the optical pickup 1. The optical pickup 1 outputs an RF signal in response to the returned light. A tracking error detector 2 outputs a tracking error signal TE in response to the RF signal. The tracking error signal TE is fed to an analog-to-digital (A/D) converter 13 within a controller 200. The tracking error signal TE is converted by the A/D converter 13 into a corresponding digital signal, which is processed within the controller 200.

A drive circuit 11 is controlled by the controller 200. The drive circuit 11 is connected to a tracking actuator 12. During a normal information reproducing process, the controller 200 operates to execute tracking servo control by controlling the drive circuit 11 in response to the tracking error signal TE.

A disk sync signal detector 8 including a phase-locked loop circuit detects a sync signal representative of rotation of the optical disk by referring to the output signal from the optical pickup 1. A frequency divider 9 divides the frequency of the output signal from the disk sync signal detector 8, and outputs clock pulses which have a predetermined regular relation with the rotation of the optical disk. The clock pulses are fed to a microprocessor 14 within the controller 200.

The drive circuit 11 is controlled by the output signal from a digital-to-analog (D/A) converter 17 within the controller 200. When a seeking process is required, the controller 200 outputs a kick pulse to the drive circuit 11. The drive circuit 11 drives the tracking actuator 12 in response to the kick pulse, so that the tracking actuator 12 jumps an information reading laser light beam over one track line part on the optical disk and specifically moves the laser light beam from a track line part to a neighboring track line part.

The optical pickup 1 monitors the above-mentioned track jumping motion, and outputs the RF signal in response to the track jumping motion. The tracking error detector 2 converts the RF signal into the tracking error signal TE. The controller 200 functions to detect whether or not the tracking error signal TE crosses a zero point. When the controller 200 detects that the tracking error signal TE crosses the zero point, the controller 200 outputs a brake pulse to the drive circuit 11. The drive circuit 11 brakes the tracking actuator 12 in response to the brake pulse.

When the controller 200 outputs the kick pulse, the controller 200 simultaneously executes a process of counting the clock pulses fed from the frequency divider 9. When the number of the counted clock pulses reaches a predetermined number, the controller 200 outputs a next kick pulse. Outputting a kick pulse is reiterated until the jump over a designated number of track line parts is completed.

As described previously, the clock pulses have the predetermined regular relation with the rotation of the optical disk. While the optical disk rotates at a constant speed, the clock pulses occur at a constant period. At the start of each kick pulse, the controller 200 starts to count the clock pulses. At the start of the kick pulse, the level of the tracking error signal TE rises from a zero level. Then, the level of the tracking error signal TE increases and decreases along a sinusoidal curve, and crosses the zero level. This change in the level of the tracking error signal TE means that the laser light beam moves from a track line part to a neighboring track line part. The controller 200 ends the kick pulse when the number of the counted clock pulses reaches a predetermined number N1. When the controller 200 detects that the level of the tracking error signal TE crosses the zero level, the controller 200 outputs a brake pulse. During the presence of the brake pulse, the level of the tracking error signal TE drops and then returns to the zero level. The controller 200 ends the brake pulse when the number of the counted clock pulses reaches a predetermined number N2. At the end of the brake pulse, the controller 200 commences the tracking servo control so that the laser light beam can start to follow the track. When the number of the counted clock pulses reaches a predetermined number N3, the controller 200 outputs a next kick pulse to execute a subsequent jump from the track line part to a neighboring track line part.

Outputting a pair of a kick pulse and a brake pulse is reiterated until the jump over a designated number of track line parts is completed. The designated number of the track line parts is corrected in response to conditions of rotation of the optical disk in order to compensate for the previously-mentioned adverse factor which might result from the spiral design of the track on the optical disk.

Figure 7:
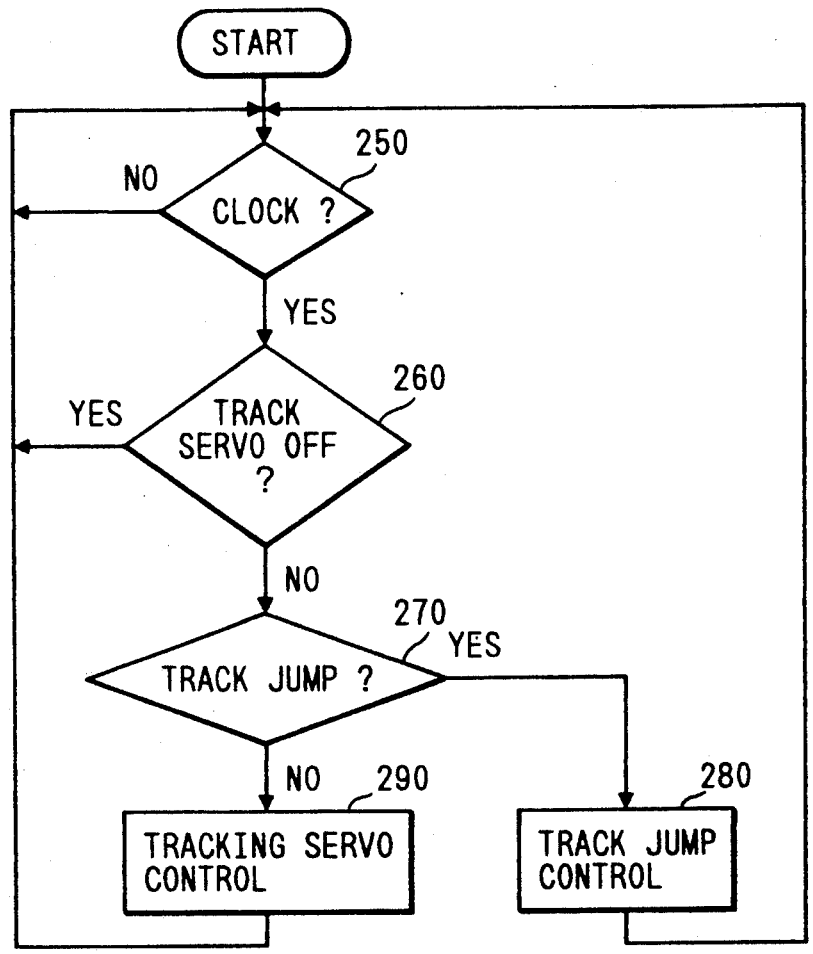
FIG. 7 is a flowchart of a program operating the controller of FIG. 6.

The controller 200 includes a combination of the microprocessor 14, a ROM 201, a RAM 16, the A/D converter 13, and the D/A converter 17. The microprocessor 14 operates in accordance with a program stored in the ROM 201. FIG. 7 is a flowchart of the program.

As shown in FIG. 7, a first step 250 of the program decides whether or not a clock pulse occurs by referring to the output signal from the frequency divider 9. When a clock pulse occurs, the program advances to a step 260. Otherwise, the step 250 is executed again.

The step 260 decides whether or not tracking servo control is required to be inactive. When the tracking servo control is required to be inactive, the program returns to the step 250. Otherwise, the program advances to a step 270.

The step 270 decides whether or not a track jumping process is required. When the tracking jumping process is required, the program advances to a track jumping control block 280. Otherwise, the program advances to a tracking servo control block 290.

The track jumping control block 280 has a sequence of steps which is basically similar to the sequence of the steps of FIG. 4. After the track jumping control block 280, the program returns to the step 250.

The tracking servo control block 290 has a sequence of steps which are designed to execute tracking servo control by controlling the drive circuit 11 in response to the tracking error signal TE. After the tracking servo control block 290, the program returns to the step 250.

What is claimed is:

1. A track jumping control apparatus for use with an information recording disk and an information reading device, the disk having a track, the reading device having an actuator responsive to a kick pulse and a brake pulse, the apparatus comprising:
   means for generating clock pulses at a frequency having a fixed relation with a rotation of the disk;
   means for counting the clock pulses;
   means for generating a first kick pulse when the counting means starts to count the clock pulses;
   means for generating a tracking error signal;
   means for detecting that the tracking error signal crosses a zero level after the first kick pulse is generated;
   means for generating a brake pulse when the detecting means detects that the tracking error signal crosses the zero level; and
   means for generating a second kick pulse when a number of the clock pulses counted by the counting means reaches a predetermined number.

2. A track jumping control apparatus for use with an information recording disk and an information reading device, the disk having a track, and the reading device having an actuator responsive to a kick pulse and a brake pulse, the apparatus comprising:
   means for generating clock pulses in response to a rotation of the disk;
   means for generating a first kick pulse;
   counting means for starting to count the clock pulses when the first kick pulse is generated;
   means for ending the first kick pulse when a number of the clock pulses counted by the counting means reaches a first predetermined number;
   means for generating a tracking error signal;
   means for detecting that the tracking error signal crosses a zero level;
   means for, during a period after the first kick pulse is ended, generating a brake pulse when the detecting means detects that the tracking error signal crosses the zero level;
   means for ending the brake pulse when a number of the clock pulses counted by the counting means reaches a second predetermined number greater than the first predetermined number; and
   means for generating a second kick pulse when a number of the clock pulses counted by the counting means reaches a third predetermined number greater than the second predetermined number.

3. A track jumping control apparatus for use with an information recording disk and an information reading device, the disk having a spiral track, the reading device having an actuator for driving a scanning light to jump between neighboring line parts of the track in response to a drive pulse, the apparatus comprising:
   means for generating clock pulses in response to a rotation of the disk;
   means for feeding a first drive pulse to the actuator;
   counting means for starting to count the clock pulses when the first drive pulse is fed to actuator; and
   means for feeding a second drive pulse to the actuator when a number of the clock pulses counted by the counting means reaches a predetermined number.

4. A track jumping control apparatus for use with an information recording disk and an information reading device, the disk having a spiral track, and the reading device having an actuator for driving a scanning light to jump between neighboring line parts of the track in response to a pair of sequentially arranged kick pulse and brake pulse, the apparatus comprising:
   means for generating a predetermined number of pairs of sequentially arranged kick pulse and brake pulse;
   means for sensing a rotation of the disk; and
   means for correcting the predetermined number of the pairs in accordance with the sensed rotation of the disk.

* * * * *